March 27, 1962 R. C. VALORE, JR 3,027,290

COMPOSITE BUILDING UNIT AND METHOD FOR MAKING SAME

Filed March 13, 1958

INVENTOR
Rudolph C. Valore, Jr.
BY
Morgan, Finnegan, Durham & Pine
ATTORNEYS

United States Patent Office 3,027,290
Patented Mar. 27, 1962

3,027,290
COMPOSITE BUILDING UNIT AND METHOD
FOR MAKING SAME
Rudolph C. Valore, Jr., Dallas, Tex., assignor to Texas Industries, Inc., Arlington, Tex., a corporation of Delaware
Filed Mar. 13, 1958, Ser. No. 721,217
3 Claims. (Cl. 156—245)

This invention relates to an improved composite building unit and a method for making such unit.

Composites of building units are well known in the art. Two examples are the recently issued patents to Sergovic, 2,751,775, and to Raskin et al., 2,752,275. The prior-art building units however suffer from the drawback that each unit is prepared in a continuous operation, resulting in a number of imperfects which must be discarded. These prior-art units also have the entire facing element cured directly to the masonry element. This results in a lack of uniformity in the depth of the facing and in the lip thereof.

An object of the present invention is to provide an improved building unit having a masonry body and a surface portion of organic polymer bonded thereto.

A further object of the present invention is to provide a novel method of applying an organic polymer surface to a masonry body.

An additional object of this invention is to provide uniform units of the type described and a novel process for producing them, which units may have the polymeric facing modified by the inclusion of fiber reinforcement, fillers, pigments, fire-retardants, and may also be modified as to their topography.

Another object of this invention is the elimination of loss due to rejection of imperfects where heretofore surfaces cured directly on the masonry portion if unsatisfactory have resulted in the substantial loss of the entire composite. Applicant's method allows for rejection of unsuitable facings before they are contacted with the masonry.

Another object of this invention is the production of a novel building unit where the properties of the facing and those of the binder can be separately controlled, which results are accomplished by steps of curing the facing and the binder independently of each other.

Further objects and advantages will be pointed out in the following description of the invention, an understanding of which will be aided by reference to the accompanying drawings.

Figure 1:
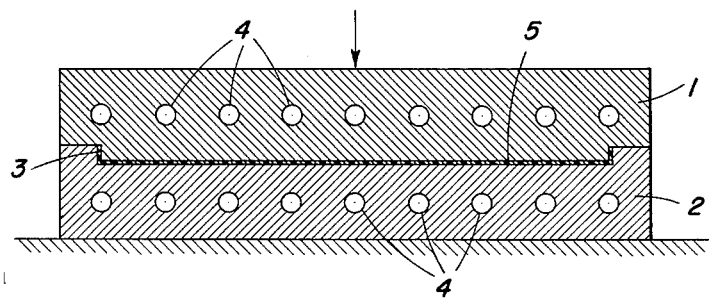
FIG. 1 is a cross section of a typical pair of mold faces used to obtain uniform-cure face pieces for the masonry unit.

The method of my invention comprises the formation of a cap or facing element from a curable polymeric material, curing it and attaching said element to a suitable masonry element by means of a self-curing or self-setting adhesive composition.

The facing element is made by using a polyester resin, pigment, a reinforcing element such as asbestos fiber or glass fiber, a filler or combination of fillers such as calcium sulfate, calcium carbonate, china clay and finely divided silica, an internal mold release composition and a catalyst. The mold composition is mixed to a puttylike consistency and then extruded into sheets or rods or shaped into balls. The sheets or rods are divided so they contain, as do the balls, just sufficient quantities of the composition to be molded to form one facing element.

A unit charge is placed in a matched metal mold and subjected to a pressure of approximately 700 to 1200 p.s.i. Concurrently the mold facings (halves) are heated to a temperature within the range 220 to 325° F. for 30–120 seconds, whereby a cure is effected. It is clear that at these conditions of temperature, pressure and time, the resin is completely cured to form the facing element having the desired shape. The preformed facing is now removed from the mold for attachment to the masonry element. It is at this point that imperfect facings may be discarded.

The preformed facing is now caused to adhere to the masonry element by coating either the face of the masonry element or the inner side of the facing, or both, with an adhesive composition comprising polyester, epoxy or other resin, which may also include pigment, filler, catalyst, accelerator and thinner. The use of an accelerator with the catalyst makes it possible for the adhesive bond to fully develop in 30 minutes to several hours at room temperature. The character of the bond developed may be modified to suit special needs by varying the constituents of the adhesive composite, such as the type and amounts of the catalyst and accelerator used. Alternatively the masonry unit may be preheated prior to attachment of the facing, to effect a strong adhesive bond in from 3 to 15 minutes.

The resins used for facing and adhesives are solutions of alkyds, in this case unsaturated polyesters, in polymerizable monomers such as styrene, vinyl toluene, or diallyl phthalate. These solutions contain inhibitors, such as tertiary butyl catechol, for increasing stability during storage. The polyesters and monomers are capable of co-reaction by addition polymerization to yield strong thermoset plastics without the evolution of any byproducts. Epoxy resins have also proven quite satisfactory but cost makes their use prohibitively expensive.

Polyesters are prepared, typically, by reacting an unsaturated dibasic acid, such as maleic anhydride, with a glycol, such as diethylene glycol. The reaction proceeds at elevated temperatures (usually above 150° C.) and is stopped at the desired point by cooling the product to room temperature. Since such reaction products are very viscous or even solid, they must be dissolved in a vinyl monomer to form solution of controllable and moderate viscosity. The monomer most commonly used is styrene.

Suitable polyesters for use in this invention are described in the patents to Sergovic and Raskin previously mentioned, and other similar resins which may be used are described in the patents to Phillips, 2,514,141, and Muskat et al., 2,370,565.

The drawings will now be more fully described.

FIG. 1 shows a mold in which a charge has been placed, closed in position for molding, where 1 is the positive face of the mold, 2 the negative face, the apposition of which forms cavity 3 which is filled with facing composition 5 which is cured by electric strip heating elements 4 at 220 to 325° F. for 30–120 seconds in the mold halves.

Figure 2:
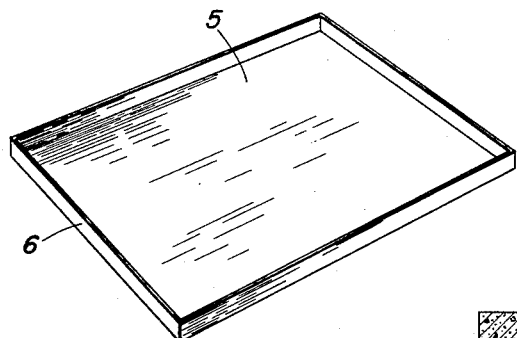
FIG. 2 is a view of the facing produced by the mold.

FIG. 2 is a perspective view of the cured facing element 5 which has a lip 6 about its perimeter.

Figure 3:
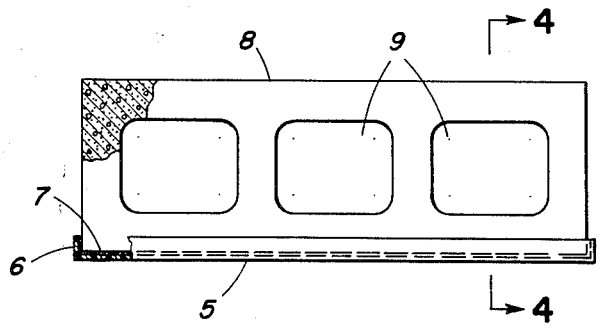
FIG. 3 is a top-elevational view of the finished composite masonry block.

FIG. 3 is a top-elevational view of a masonry block 8 having a cured polymer facing 5 bonded to it by binder 7 which forms a binding layer between the masonry block 8 and the facing 5 and lip 6. The somewhat rectangular areas designated as 9 are merely the channels conventional in masonry blocks. The self-curing binder 7 is initially uncured. The masonry-block element is placed in or on the facing element with the uncured binder intermediate the two. The composite building unit is a finished product when the binder has fully developed or set.

Figure 4:
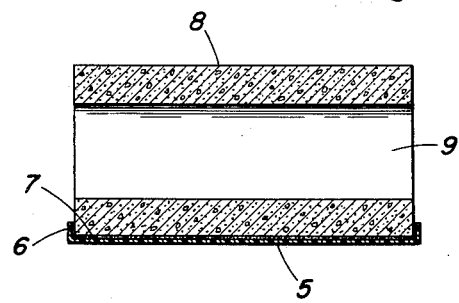
FIG. 4 is a sectional view of the composite block approximately on the 4—4 of FIG. 3.

FIG. 4 is a sectional view of the composite building unit at approximately the level of 4—4 of FIG. 3, where 8 indicates the masonry block walls on either side of channel 5, where the preformed facing element 5 is bonded to one face of the block by the self-curing binder 7.

EXAMPLES

Example 1

All parts shown herein are by weight.

FACING

| | Parts |
|---|---|
| Polyester of fumaric acid, maleic acid and ethylene glycol in a 2:2:3 mole ratio | 100 |
| Styrene | 25 |
| Benzoyl peroxide | 1 |
| Fiberglas | 50 |
| Limestone flour | 100 |
| Calcium carbonate (resin-coated) | 200 |
| Zinc stearate | 1 |
| Titanium dioxide | 4 |
| [Antimony trioxide+chlorinated paraffin in a ratio of 1:1] | 6 |

ADHESIVE

| | |
|---|---|
| Polyester of diethylene glycol and maleic anhydride in a 1:2 mole ratio | 100 |
| Styrene | 35 |
| Benzoyl peroxide | 1.0 |
| Methyl ethyl ketone peroxide solution | 0.7 |
| Resin-treated calcium carbonate (Surfex) | 250 |
| Silica sand (− 50 to +200 sieve) | 250 |
| Cobalt naphthenate solution | 0.3 |

Example 2

FACING

| | |
|---|---|
| Polyester of methyl terephthalate and ethylene glycol in a 3:2 mole ratio | 35 |
| MEK peroxide | 2 |
| Asbestos fibres | 10 |
| China clay | 40 |
| Calcium stearate | 1 |
| Iron oxide (red) | 2 |

ADHESIVE

| | |
|---|---|
| Polyester of methyl terephthalate and ethylene glycol in a 3:2 mole ratio | 20 |
| Styrene | 10 |
| Methyl ethyl ketone peroxide | 0.5 |
| Benzoyl peroxide | 0.5 |
| Silica flour | 90 |
| Cobalt naphthenate | 1 |

Example 3

FACING

| | |
|---|---|
| Polyester of ethylene glycol and maleic anhydride in a 3:5 mole ratio | 40 |
| Diallyl phthalate | 20 |
| Benzoyl peroxide | 1 |
| Sisal | 18 |
| Silica flour | 90 |
| Aluminum stearate | 1 |
| Chrome yellow | 3 |
| [Antimony oxide+chlorinated paraffin in a ratio of 1:1] | 6 |

ADHESIVE

| | Parts |
|---|---|
| Polyester of ethylene glycol and maleic anhydride in a 3:5 mole ratio | 20 |
| Styrene | 20 |
| [Benzoyl peroxide+MEK peroxide in a ratio of 1:1] | 0.8 |
| Silica flour | 90 |
| Copper naphthenate | 1.2 |

Example 4

FACING

| | |
|---|---|
| Polyester of ethylene glycol and tetrachlorophthalic anhydride in a 1:2 mole ratio | 40 |
| MEK peroxide | 0.2 |
| Wollastonite | 2 |
| Glass beads | 40 |
| Calcium stearate | 0.2 |
| Chrome green | 0.2 |

ADHESIVE

| | |
|---|---|
| Polyester of ethylene glycol and tetrachlorophthalic anhydride in a 2:3 mole ratio | 20 |
| Styrene | 5 |
| Benzoyl peroxide | 0.2 |
| Methyl ethyl ketone peroxide | 0.2 |
| Limestone flour | 60 |
| Cobalt naphthenate | 0.1 |

The invention is illustrated but in no way limited by the foregoing examples. Many variations may be made therein and still remain within the scope of the invention as disclosed.

What is claimed is:

1. A method of treating the surface of a masonry building unit which comprises pre-forming a facing element from a curable polyester material by subjecting a composition containing the curable polyester material and a catalyst and accelerator therefor to a pressure of about 700 to 1200 p.s.i. and a temperature of 220 to 325° F. for 30 to 120 seconds, to effect a complete cure and to produce a pre-formed, pre-shaped, completely cured facing element, coating a surface of a member of the group consisting of the preformed, completely cured facing element and the masonry building unit with an uncured adhesive composition, pressing the coated surface of said member against a surface of the other member, and curing the adhesive composition.

2. The method of claim 1 wherein the curable polymeric material contains a filler.

3. The method of claim 1 wherein the curable polymeric material contains a fibrous reinforcement.

References Cited in the file of this patent

UNITED STATES PATENTS

| 2,514,141 | Phillips | July 4, 1950 |
| 2,751,775 | Sergovic | June 26, 1956 |
| 2,752,275 | Raskin et al. | June 26, 1956 |
| 2,805,448 | Rubenstein | Sept. 10, 1957 |
| 2,817,619 | Bickel et al. | Dec. 24, 1957 |
| 2,850,890 | Rubenstein | Sept. 9, 1958 |

OTHER REFERENCES

"Modern Plastics," October 1947; pp. 111–115.
"Concrete," June 1949; pp. 12 and 45.